(12) United States Patent
Foerster et al.

(10) Patent No.: US 11,106,306 B2
(45) Date of Patent: *Aug. 31, 2021

(54) SYSTEM AND METHOD FOR RETRIEVING INFORMATION FROM AN INFORMATION CARRIER BY MEANS OF A CAPACITIVE TOUCH SCREEN

(71) Applicant: Touchcode Technologies, LLC, New York, NY (US)

(72) Inventors: Matthias Foerster, Dresden (DE); Sascha Voigt, Bernsdorf (DE); Jan Thiele, Chemnitz (DE); André Kreutzer, Mittweida (DE)

(73) Assignee: Touchcode Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,427

(22) Filed: Aug. 6, 2018

(65) Prior Publication Data

US 2019/0102035 A1    Apr. 4, 2019

Related U.S. Application Data

(63) Continuation of application No. 14/817,145, filed on Aug. 3, 2015, now Pat. No. 10,042,458, which is a (Continued)

(30) Foreign Application Priority Data

Nov. 29, 2010  (EP) .................................. 10193023

(51) Int. Cl.
*G06F 3/041*      (2006.01)
*G06F 3/0488*     (2013.01)
(Continued)

(52) U.S. Cl.
CPC ............ *G06F 3/0416* (2013.01); *G06F 3/002* (2013.01); *G06F 3/016* (2013.01); *G06F 3/0393* (2019.05);
(Continued)

(58) Field of Classification Search
CPC ........ G06F 3/0416; G06F 3/044; G06F 3/016; G06F 3/0488; G06F 2203/04809; G06K 19/067; G06K 7/081; G06K 7/089
See application file for complete search history.

(56) References Cited

U.S. PATENT DOCUMENTS

2006/0208066 A1 *  9/2006  Finn ....................... H04H 60/63
                                                  235/380
2010/0045627 A1 *  2/2010  Kennedy ............ H04N 1/00068
                                                  345/173
(Continued)

*Primary Examiner* — Premal R Patel
(74) *Attorney, Agent, or Firm* — Wolf, Greenfield & Sacks, P.C.

(57) ABSTRACT

The present invention relates to a method comprising providing one or more information carrier(s) with a dielectric and/or conductive pattern and a detection device having a capacitive touch screen and inducing an interaction between the information carrier and the touch screen, wherein the interaction is based on a difference in the dielectric coefficient and/or the conductivity of the pattern and generates a touch signal and wherein the interaction is induced by relative motion between the information carrier and the touch screen. The invention further relates to a system comprising an information carrier comprising a dielectric and/or conductive pattern which encodes information and a detection device having a touch screen; the detection device is able to decode the information upon interaction between the information carrier and the touch screen, wherein the interaction is caused by a difference in the dielectric coefficient and/or the conductivity of the pattern.

20 Claims, 25 Drawing Sheets

Figure 1:
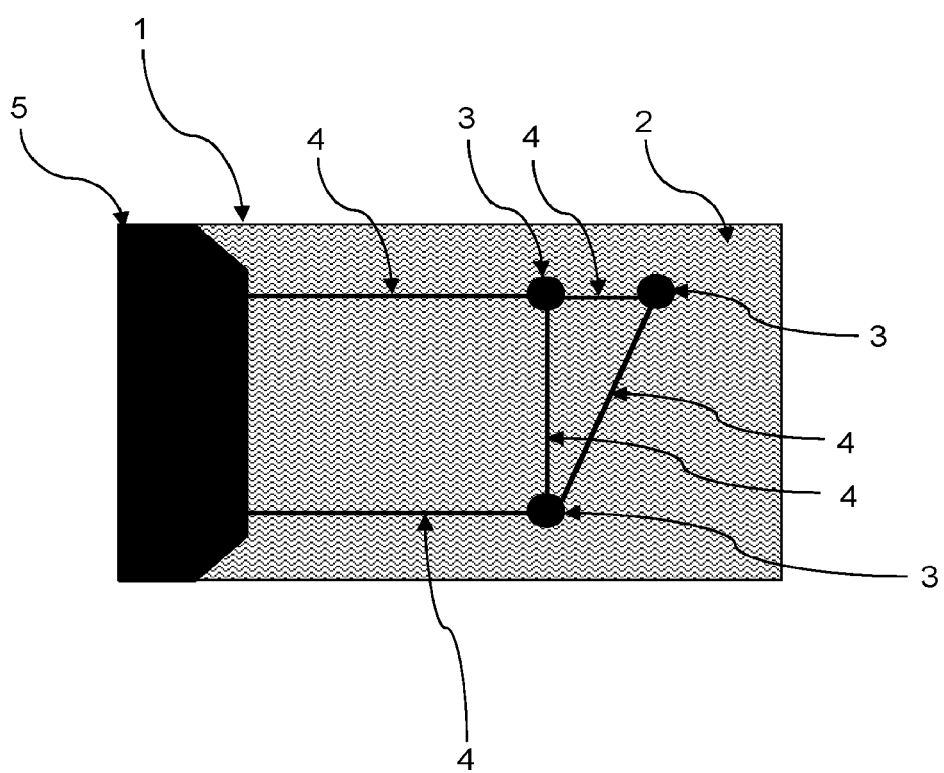
Figure 2:
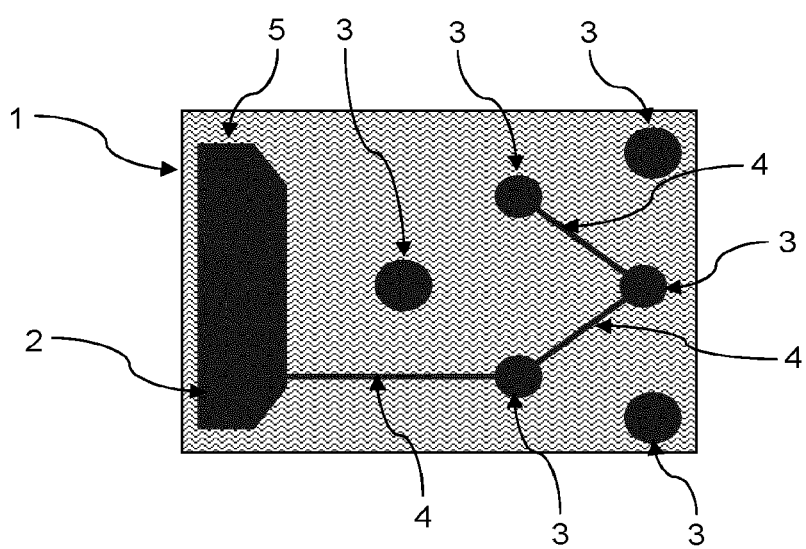

Related U.S. Application Data continuation of application No. 13/950,664, filed on Jul. 25, 2013, now Pat. No. 9,098,158, which is a continuation of application No. 13/576,976, filed as application No. PCT/EP2011/071319 on Nov. 29, 2011, now Pat. No. 8,497,850.

(51) Int. Cl.
| | | |
|---|---|---|
| *G06K 7/08* | (2006.01) | |
| *G06K 19/067* | (2006.01) | |
| *G06F 3/039* | (2013.01) | |
| *G06F 3/00* | (2006.01) | |
| *G06F 3/044* | (2006.01) | |
| *G06F 3/01* | (2006.01) | |

(52) U.S. Cl.
CPC ............ *G06F 3/044* (2013.01); *G06F 3/0488* (2013.01); *G06F 3/04162* (2019.05); *G06K 7/081* (2013.01); *G06K 7/089* (2013.01); *G06K 19/067* (2013.01); *G06F 2203/04809* (2013.01)

(56) References Cited

U.S. PATENT DOCUMENTS

2011/0284640 A1* 11/2011 Mullen ................. G07F 7/0833
  235/469
2013/0194192 A1* 8/2013 Andolina .............. G06F 3/0416
  345/173

\* cited by examiner

SYSTEM AND METHOD FOR RETRIEVING INFORMATION FROM AN INFORMATION CARRIER BY MEANS OF A CAPACITIVE TOUCH SCREEN

Related Applications

This application is a continuation of U.S. application Ser. No. 14/817,145, filed Aug. 3, 2015, which is a continuation of U.S. application Ser. No. 13/950,664, filed Jul. 25, 2013, which is a continuation of U.S. application Ser. No. 13/576,976 (now U.S. Pat. No. 9,098,158), filed Aug. 3, 2012, which is a national stage of International Application No. PCT/EP2011/071319, filed Nov. 29, 2011 and claiming priority to European Application No. EP10193023.8, filed Nov. 29, 2010, the disclosures of which are all incorporated by reference.

TECHNICAL FIELD

The present invention generally refers to a method and system comprising an information carrier and a detection device having a touch screen, and a method to read out the information on the information carrier with the detection device.

BACKGROUND OF THE INVENTION

During the past decades, there has been a rapid development in data processing and storing. In the field of information technology, a multitude of media to store information has been developed. They include floppy disks, compact disks (abbreviated as CD's), digital versatile disks (known as DVD's), USB flash drives, multitude of data cards and numerous other devices. However, these devices storing information have several properties limiting their field of application.

Compared to classical data storage (such as printed information) they are much more complex and therefore harder to produce. This makes them less economic in certain applications. It is for example hard to imagine that these devices could replace bar codes placed on articles in a department store. Though all these devices can easily perform the task of storing the (very limited) amount of data for the article (e.g. name of article, price, serial number, date of expiry, etc.), they are too complex and thus expensive to be used in such an environment. However, there may be other applications where a data-storage device encoding the data in an optical pattern (e.g. the said barcode) is not desirable. Though it is simple and therefore cheap to produce, it has the disadvantage that only a very limited amount of data may be encoded with it.

Moreover, it is generally easy to counterfeit a bar code, which makes it much less safe than more sophisticated data storage devices. One reason for this is the fact that the information is encoded in a visible pattern. Thus, copying the barcode may be enough to generate a counterfeit.

Another disadvantage of the optical pattern lies in the fact that deviations of the surface where the optical pattern is applied to (e.g. scratches and the like) may lead to malfunctions.

The relatively new technology disclosed in WO 2010/043422 and WO 2010/051802 overcomes the disadvantages of the established prior art mentioned above. The basic idea of the information carriers presented in these two publications is to use information carriers comprising a pattern of conductive and non-conductive regions.

In comparison to storing the information in an optical pattern, this technology has the advantage of being a lot harder to copy (and counterfeit). Moreover, the pattern of conductive and non-conductive regions might not lie on the surface of the information carrier. Thus, these information carriers are much more resistant to external influences, including, but not limited to, physical stress, scratches, humidity and the like.

At the same time, they can be produced in simple processes—thus making them much cheaper and more economic as the more complex devices mentioned above. The fact that they are less complex further enables them to be used in a multitude of applications. However, for certain applications a potential disadvantage of the information carriers described in WO 2010/043422 and WO 2010/051802 may be seen in that specific devices are needed to read out and decode the information stored on these information carriers (this is in fact a disadvantage of all data storage devices mentioned above). These devices are thus specially designed and optimized for the corresponding information carrier(s), which adds costs to the decoding method and system and makes it more expensive for the user.

During the rise of information technology, there has also been a rapid development in the sector of personal computers, laptops, smart phones, tablet computers and the like. In these devices, the usage of touch screens has become more common over the last years. Touch screens usually allow the user to induce an input by touching a designated area of these devices.

There are different technologies for these touch screens to operate, including resistive, capacitive, acoustic wave and infrared technologies. All these technologies are optimized to detect a human finger or a specially designed stylus that is brought into contact with the touch screen.

According to recent developments, systems including touch screens can also be used to recognize certain shapes of inanimate objects. For example, US 2010/0045627 discloses placing a specifically shaped object (a so-called signet) onto a touch screen, wherein the system will then compare the shape of this signet with shapes stored in a database. In case there is a match between the presented shape and a shape in the database, it will perform an action. Examples for these actions include giving access to restricted areas of a computer system, logging onto a certain user profile of a computer system and the like. However, the technology disclosed in US 2010/0045627 has several major drawbacks. First, this technology is limited to signets that are recognized by a pre-stored database. Thus, the system only works and performs certain actions if it recognizes a known object. Thus, this technology is limited in its usability, in particular with regard to interpreting shapes that are new to the system. Thus, these systems cannot be used to read out and decode encoded information being new to the system. This means in particular that the technology disclosed in US 2010/0045627 does not allow the touch screen to be an input device for information carriers new to the system.

Second, the technology disclosed in US 2010/0045627 entirely relies on the shape of the objects. The touch screen proposed in US 2010/0045627 for shape recognition is particularly optimized for an input signal being pressure imposed by a human finger or a stylus. However, the shape of an object is generally visible to the naked eye and furthermore detectable by touch.

There are numerous applications where these properties are disadvantageous. Likewise, it is desirable to establish a technology in which the touch screen can be used as an input device for structures prior not known by the system.

SUMMARY OF THE INVENTION

In light of the prior art and the disadvantages of the state of the art, the technical problem underlying the present invention is to provide a system and method which overcome the mentioned disadvantages.

This problem is solved by the features of the independent claims. Preferred embodiments of the present invention are provided by the dependent claims.

The invention relates to a method with the following steps:
 a. providing one or more information carrier(s) with a dielectric and/or conductive pattern and a detection device having a capacitive touch screen and
 b. inducing an interaction between the information carrier and the touch screen, wherein the interaction is based on a difference in the dielectric coefficient and/or the conductivity of the pattern and generates a touch signal and
 c. wherein the interaction is induced by relative motion between the information carrier and the touch screen.

Useful for the present invention is particularly an information carrier comprising a dielectric and/or conductive pattern In the context of the present disclosure, an information carrier is preferably any object. The information carrier carries encoded information, which can be simple, signed and/or encrypted. A simple information carrier may induce events in a device that is connected to and/or in a program (that is, preferably locally in a device). A signed information carrier may further induce events in an external system to manipulate data, which is connected via a data network. An encrypted information carrier may be decrypted locally by a program and/or by an external data processing system and may then induce events in the program flow of the device and/or in the external data processing system.

Examples of objects include, but are not limited to printed products or objects that can be printed on, especially playing cards, business cards, credit cards, debit cards, stamps, signatures, postcards, (entrance) tickets and generally admission cards to restricted areas (both physical areas and virtual zones), member cards, tickets valid for a limited time, certificates (e.g., proving the origin of an object), bill of delivery and/or sale, abstracts of accounts, instruction leaflets, vouchers (e.g. for objects in computer games and/or downloads of music, videos, e-books) and the like, but also any common products such as cups, glasses, consumer packaged goods, consumables and pre-products. The substrate of the information carrier may consist of these objects or may be attached to these objects in any suitable manner.

The information carrier for use with the present invention provides several advantages over the prior art. For example, an information carrier comprising and/or encoding multiple information types may be provided in a simple and cost efficient manner. Multiple information may be used to provide for redundancy, different ranges of readability and reader-adapted functionalities (such as optic, capacitive and the like). In other words, one and the same information carrier may comprise information which can be read optically, resistively, acoustically or capacitively or different bits of the information may have a different operating distance and may thus be read with different reading devices or detection devices. In the sense of the invention, it is preferred, that the information carrier is read by the detection device. However, it is also possible or may be preferred to read the information carrier with a separate reading device.

The substrate of the information carrier may be rigid or flexible. Preferably, the substrate comprises one or more of the following materials: plastics, synthetic materials, paper, carton, (derived) timber products, composite materials, ceramics, glass, cloths, textiles, leather or any combination of the mentioned materials. Preferred synthetic materials comprise PVC, PETG, PV, PETX, PE and synthetic paper.

In the context of the present disclosure, region (which may also be referred to as domains, structures, areas, portions, parts, divisions and/or zones) refers to any shape, which may be one-dimensional (i.e. points or lines), two-dimensional (i.e. areas of a particular shape) and/or three-dimensional (i.e. areas with a particular height), wherein generally two-dimensional shapes are preferred. Examples may include (but are not limited to) squares, circles, triangles, rectangles, dots, pixels and lines. Preferably, the following properties of these regions may be used to encode information: shape, orientation, number, distance between regions and/or relative position between regions.

The information can preferably comprise a coupling area. The coupling area preferably is an area of generally conductive material on the information carrier itself or coupled to the information carrier and electrically linked via conductive path(s) to one or more of the conductive regions such that the linked region(s) have the same electric potential as the coupling area. The coupling area is preferably easily accessible by a user in order to set the coupling area's potential onto the user's potential. The coupling area need not be a closed area but may comprise a grid of conductive lines or an array of electrically connected structures. The coupling area is preferably electrically not exposed, i.e., covered or coated by a non-conductive material, and provides electrical contact to the exterior of the information carrier. The coupling area may comprise the same material as the conductive regions or a different material.

The coupling area can for example be used in such a way that the user places his/her finger on or close to this coupling area. Thus, the region(s) linked to this coupling area will have substantially the same electric potential as the user's finger. This may be advantageous, since touch screens are commonly designed to work with a typical capacity of a user. The coupling area need not necessarily be directly contacted by the user's finger, since the finger being in close proximity to the coupling area may sufficiently influence the capacity of the coupling area to achieve the desired effect. Preferably, the coupling area is of the same conductive material as the region(s) of conductive material and/or the conductive path(s). This may allow a simple and inexpensive production process.

It is preferred that the pattern encoding information imitates the properties of fingers with respect to a signal generated on a touch screen. In other words, the one or more regions brought into contact or at least close proximity with a touch screen generate a signal analogous to the one generated by one or more fingers touching a touch screen. In this context, the size, shape and/or capacitive properties are preferably chosen to be similar to those of finger tips. It was very surprising, that single or multi touch events can be generated by the information carrier.

By using the dielectric properties of the information carrier, the information stored or encrypted on the information carrier is no longer directly connected to the spatial shape. This has several advantages. The pattern does typically not affect the surface of the carrier which allows for a much more versatile use of the information carrier compared to the signets known from US 2010/0045627.

Advantageously, the coupling area comprises conductive lines, e.g. a grid, which preferably extend over substantially one side of the substrate. Thus, a user need not to touch the information carrier at a specific location, but may touch the grid at any location in order to electrically connect himself to the conductive regions. Alternatively, the user may bring his finger or fingers into close proximity of the coupling area to sufficiently affect the coupling area's capacity.

It is also preferred that the coupling area extends to at least one edge and/or corner of the information carrier. If the carrier is placed onto a touch screen it is most convenient to touch the carrier at its edge and/or corner. Thus, the coupling area extending to at least one edge and/or corner of the information carrier may ease the access thereto. An extension to an edge or corner does also encompass the situation, wherein only a small gap between the edge or corner and the coupling area is provided, the gap, e.g., being smaller than 5 mm, preferably smaller than 3 mm.

As the read out of the information stored on the information carrier is to be performed by a touch screen, it is preferred that the surface of said pattern is substantially flat. In the context of the present application, substantially flat corresponds to a generally 2-dimensional area with deviations at the transition between the substrate and the region of generally less than 200 μm, preferably less than 50 μm, more preferably less than 5 μm perpendicular to the surface. This, in general, depends on the method of application: While in the case of screen printing the applied print layer typically has a thickness of about 5 to 50 μm, layer thicknesses of less than 2 μm may be achieved by cold foil transfer methods. In the case of inkjet printing (e.g. a metal containing ink) the pattern may be as flat as the substrate (due to its natural roughness). However, it may also be preferred that the pattern encoding the information is not formed as a top layer (i.e. the layer on the surface). It may also be preferred that the pattern is formed in all three spatial directions, e.g. by applying different layers with different two-dimensional "sub patterns" on top of each other. Also, the pattern may be covered by another non-conductive layer. There may also be one or more conductive layers behind the layer encoding the information as long as there is no electric contact between the additional conductive layers and the layer encoding the information.

Examples where the present invention can be used include (but are not limited to) access to restricted areas (both physical and virtual), usage of restricted data, usage of restricted hardware, franking, prepayment, postal charges, logistic of goods, applications in marketing and/or sale, customer loyalty, assurance against adulteration, copy rights, pay-back programs, device control, lotteries, applications for payment and the like.

Preferred materials for a second or third material are: metals such as aluminum, lead, iron, gold, copper, magnesium, tungsten, zinc, tin, graphite, chrome, molybdenum; carbon black; dielectric materials; materials containing metals such as foils or films with a metal (e.g. aluminum) layer.

Preferably, the second and/or third material is applied onto the substrate by additive and/or subtractive methods, preferably by printing or laminating the second and/or third material onto the substrate. In additive methods, the second and/or third material is readily applied onto the substrate. This may happen in one or more steps of production. Additive methods include, but are not limited to, printing, laminating, transfer and coating methods, for example the methods described in WO 2010/043422. In subtractive methods, the second and/or third material is added onto the substrate in excess. In one or more following steps, parts of the second and/or third material are removed (e.g. by laser procedures and/or cauterization). For both methods, printing the second and/or third material onto the substrate is an easy and economic procedure to achieve the desired pattern and thus preferred. Yet, other methods are also encompassed by the present invention. Preferably, the information carrier comprises layers of substrate and/or the second and/or third material.

Furthermore, it may also be advantageous to provide an information carrier with two or more coupling areas in which each of them is electrically connected to one or more subsets of the conductive regions, respectively, via conductive paths. By this, the user can choose one or more coupling areas. If, for instance, the user places his/her finger(s) on one of the coupling areas, only a certain subset of the regions will have the same electric potential as the user's finger(s). If the detection device is sufficiently sensitive, only this subset can be detected. Thus, the user can activate the detection of certain subsets and deactivate the detection of the remaining subsets. This can, for instance, be used to enable the user to make a yes/no decision.

In the generally two-dimensional shape of the information carrier, it may be preferred to place the coupling area(s) on the same side as the pattern with conductive materials. This allows a simple production process. Another option is to place the coupling area(s) on the side opposite to the conductive regions. This may be advantageous since the side with conductive regions is generally not easily accessible (since generally in contact with the touch screen) by the user when interaction with the touch screen is performed. In particular, it may be preferable to have the whole side opposite to the pattern as a coupling area. In this case, the user would not have to touch a designated area of this side, but simply any point on this side. This could allow an easier and more user-friendly operation. Yet another preferred option is to place the coupling area in such a way that it can be accessed from both sides. Furthermore, any combination of these options, for example, having one or more coupling areas on the same side as the conductive regions and one or more coupling areas on the opposite side is also envisaged.

The present disclosure furthermore relates to a kit or system comprising a product and an information carrier, the information carrier being releasably connected or permanently fixed to the product or part of the product itself, e.g. by using the material of the product as a substrate for the information carrier. Releasable connections may include, but are not limited to, magnetic connection, hook-and-loop fasteners, techniques making use of vacuum, non-permanent adhesives, form-locked fixing, material-locked fixing and the like. Permanent fixation may include, but is not limited to, the two objects being glued to each other (with permanent glue), the information carrier being printed onto the product. The product mentioned above may be any object which one desires to connect to the information carrier. Examples for this include, but are not limited to, packages, dishes, printed products, clothes, furniture, documents, toys, consumer goods, food, semi-finished products, (parts of) machine(s), building materials, electrical goods and/or reusable materials (e.g. bottles).

The method further comprises a detection device, that has a touch screen and wherein is adapted to decode information upon interaction with an information carrier comprising a dielectric and/or conductive pattern which encodes the information, wherein the interaction is based on a difference in the dielectric coefficient and/or the conductivity of the pattern, and wherein the interaction is induced by relative motion between the information carrier and the touch screen. It is preferred that the touch screen is adapted to detect the dielectric/conductive pattern. It is also preferred that the detection device is adapted to detect whether the information carrier interacts with the detection device. Further, it is preferred that decoding of information is at least partially performed by a computer program.

This is particularly advantageous over prior art technologies since the read out is performed by a touch screen. In contrast to the specialized detection devices, a touch screen is a detection device which is common in numerous electronic devices. This makes this technology more economic and versatile than the formerly known solutions.

In the context of the present invention, a dielectric pattern is a pattern defining areas or regions having different dielectric properties, in particular different dielectric coefficients. In the context of the present invention, a conductive pattern is a pattern defining areas or regions having different conductive properties, in particular different conductivities. The dielectric coefficient and/or conductivity may vary continuously over the pattern or in discrete steps. The pattern may comprise two distinct coefficients or a plurality of predefined dielectric coefficients/conductivities. That is, an object with a dielectric or conductive pattern is an object where the specific dielectric coefficient or conductivity depends from the position on the object. This may be achieved, for example, by providing an object comprising materials with different dielectric coefficients and/or conductivities. It may also be achieved by providing an object with a position dependent density.

Preferably, the information carrier comprises a substrate comprising a first material with a first dielectric coefficient $\varepsilon 1$, wherein the pattern is formed by said substrate and one or more regions of a second material with a second dielectric coefficient $\varepsilon 2$, the second coefficient $\varepsilon 2$ being different from the first coefficient $\varepsilon 1$. Other termini for the dielectric coefficient may include capacitivity, dielectric constant, dielectric permittivity, inductive capacity, permittivity and/or relative permittivity.

It is preferred to provide the information carrier in such a way that the first material, i.e. the material of the substrate, is non-conductive and the second material is conductive. This may also be inverted. Thus, the dielectric/conductive contrast is enhanced. Example electrically conductive materials include, without being limited to, metals, metal particles, materials comprising conductive particles, conductive polymers or any combination of the mentioned materials. It is preferred that the conductive particles comprise carbon black and/or graphite particles. Beyond these materials salts and electrolytes are also possible, as well as liquids, inks and fluids and/or combination of the mentioned materials. It is preferred that liquids, fluids and the like materials get gelled and/or cured, tempered or in any other way stabilized for further processing and/or handling. Stabilizing can also be reached by penetration of the fluids into a soaking surface.

In case the first and second materials are non-conductive and conductive, respectively, the information carrier may comprise any of the features discussed above with respect to the inventive information carrier, alone or in combination.

In the context of the present invention, a touch screen is an electronic visual display that can detect the presence and/or location of a touch by a human finger and/or a stylus. A touch screen is a generally two-dimensional sensing structure which can detect where it is touched.

These touch screens are common in (but not limited to) smart phones, mobile phones, displays, tablet-PCs, tablet notebooks, graphic tablets, television devices, trackpads, touchpads, input devices, PDAs, and/or MP3 devices. Technologies to perform this detection include resistive, capacitive, acoustic and optical technologies.

According to the invention, the interaction between the information carrier and the touch screen can be one of the above-mentioned interactions. A capacitive interaction between the information carrier and the detection device is generally preferred. Preferably, the touch screen is adapted to detect the dielectric/conductive pattern (of the information carrier), i.e. it has a sensitivity which is sufficient to detect the difference in the dielectric coefficient/conductivity of the pattern. For this purpose, the pattern could be designed such as to allow its detection by the detection device. Vice versa the spatial resolution of the detection device and its resolution in term of measuring a change in capacity could be adapted to the type of the pattern.

It is preferred that the detection device is adapted to detect whether the information carrier interacts with the detection device or wherein a proximity between the information carrier and the touch screen is detected by the detection device. This may be achieved by including a certain threshold signal strength, in particular a threshold for the contrast in the received signal, beyond which actions are performed. It is preferred that the detection device can also operate when there is an interaction between the detection device and two or more information carriers. This may allow the system to perform more complex operations. One example how this can be used is by accessing a restricted area only when two information carriers are presented to the system at the same time (e.g. a laboratory which may not be entered by a single person for security reasons).

It is preferred, that the interaction between information carrier and touch screen generates a touch signal. A touch signal in the context of this patent is a signal in a detection device with a touch screen that is analogous or at least similar to a signal generated when the touch screen is touched by one or more fingers of a user. In other words, the pattern of the information carrier is designed to generate a signal on a touch screen which imitates a "typical" finger touch. Accordingly, size and shape of the structures forming the pattern may be chosen accordingly as well as their arrangement. Furthermore, the materials used by the pattern may be chosen accordingly.

Alternatively, the touch screen may be adapted by appropriate software and/or hardware changes that it recognized the pattern of the information carrier even though the pattern does not simulate a "typical" finger touch. Rather, the touch screen recognized a minimum difference in capacity and/or dielectric coefficient in between the first and second materials so as to be able to decode the encoded information.

Preferably, this touch signal is a capacitive one. This may correspond to a capacitive interaction between the information carrier and the touch screen. It may also be preferred that this procedure (or method) comprises a further step of decoding information encoded by the dielectric and/or conductive pattern by means of the detection device. This would then allow this method to read out information formerly not known by the detection device. The method may also comprise a further step of inducing events in the system. Examples include, but are not limited to, logging onto the system, getting access to certain (restricted) areas (of the system and/or to the internet), starting a program, doing a payment and/or verification, upload and/or download content, play a game, control and/or manipulate programs, alteration of numerical values and/or part(s) of text, manipulation of graphics, alteration of data and the like.

Inducing the interaction between the information carrier and the touch screen may be achieved in different ways. One preferred way to achieve this is to bring the information carrier and the touch screen into at least partial direct contact. In the context of the present invention, this means that the touch screen and the information carrier touch each other (at least partially). One preferred way to do this is by placing at least a part of the information carrier on at least part of the touch screen. This may for example be done by holding the information carrier onto the touch screen or by laying the information carrier on top of the touch screen, or vice versa. Holding can either be performed manually by the user or by a mean adapted to hold the information carrier in position. However, the partial contact is not limited to a static one.

It is preferred that the interaction between the information carrier and the touch screen is induced by relative motion. The relative motion includes especially manipulating gestures, deictic gestures, symbolic gestures, emulating gestures and/or imitating gestures or a slide-through-gesture, a slide-in-gesture, a turnkey-gesture, putting, slapping, crumpling, rubbing and/or a combination of these. Furthermore, multi-touch are also preferred, comprising taps, double taps, scroll, pan or flick. A person skilled in the arts knows that gestures represent a non-verbal way of communication. In respect to the present invention, it is a communication between an information carrier and a touch screen. The information carrier can interact in various ways with the touch screen and it was very surprising, that the interaction can occur in form of a relative motion.

For example it is possible to swipe at least a part of the information carrier across at least a part of the touch screen. Using relative motions or especially gestures is preferred when the information carrier is stationary and the touch screen is moving, the touch screen is stationary and the information carrier is moving or the touch screen and the information carrier are moving. This may be advantageous if the touch screen is part of a relatively large device which cannot be moved easily (e.g. the display of an ATM machine) and/or the information carrier is small and can therefore be easily handled. Another possibility is to move, for example to swipe at least part of the touch screen across at least part of the information carrier. This may be preferred in case the touch screen is part of a small device (e.g. a smart phone) that can easily be handled and/or the information carrier is either large in itself or connected in such a way that it cannot be handled easily (e.g. fixed to a heavy item). It is also preferred that the detection device and/or the information carrier is moved. It may be advantageous, if the information carrier is moved relative to the detection device or if the detection device is moved relative to the information carrier. Furthermore, moving the detection device comprising the touch screen across the information carrier may be advantageous (in fact, sometimes even necessary) if the (generally two-dimensional) size of the information carrier is larger than the area of the touch screen. It is also preferred that the detection device and/or the information carrier is aligned in a vertical or horizontal orientation. The detection device and/or the information carrier can be for example attached to a vertical wall or arranged on a table (or as a table). The person skilled in the art is familiar with various methods or techniques of attaching a device or in general an object to another static or moving object.

In the context of relative motion between the information carrier and the touch screen, it is also preferred that the properties of the motion encode information which may lead to events, optionally different events. The properties of the motion include, but are not limited to, direction of the motion, speed of the motion and the like. An example may be that a user can log onto a computer system (or start a program) by moving the information carrier into one direction. Moving the information carrier into the other direction may lead to log out (or the program being terminated). However, for the interaction to be sufficiently strong, it may not even be necessary to bring the information carrier and the touch screen into direct contact, i.e. to make these two devices touch each other. It was very surprising that even the contact time or each single time of interaction or especially the time of the relative motion occurs for less than 1 minute, preferred for less than 30 seconds and especially preferred for less than 15 seconds. Inducing an interaction may also be achieved by bringing the information carrier into proximity of the touch screen, preferably within 2 cm of the touch screen. A rather small range of interaction is advantageous in terms of security over, e.g., RFID technology, since sensitive information cannot be read out over large distances.

Again, it is preferred that the preferred method can be applied to both using a single information carrier and using two or more information carriers at the same time. It may also be preferred that the two or more information carriers are not presented to the detection device at the same time, but at least partially shifted in time. This may be advantageous as it allows more complex operations or as a feature within the concrete application of the information carrier.

It is also preferred that the interaction between a user of the detection device, the touch screen and/or the information carrier comprises the following interactions:
 a. the user is interacting with the information carrier,
 b. the information carrier is interacting with the touch screen,
 c. the user is interacting with the information carrier and the touch screen,
 d. the information carrier is interacting with the user and the touch screen and/or
 e. the touch screen is interacting with the user and the information carrier.

The user can have two or more connections with the information carrier. It was previously described that the information carrier can comprise coupling areas. The user can touch or interact with for example the coupling area and another conductive area on the information carrier. This allows to generate complex interactions between the information carrier and the touch screen. In the sense of the invention, the term "connections" describes an interaction between the user and the information carrier and comprises preferably that the user touches the information carrier. However, it is also preferred, that at least two users are connected to the information carrier and/or are interacting with the touch screen.

In a preferred method, a feedback is returned from the detection device and/or a device connected to the detection device by haptic perception, tactile perception, auditory perception and/or visual perception. It may be advantageous, when the detection device indicates whether an interaction with the information carrier was successfully established or not. Therefore, the detection device comprises means that allow for positive or negative feedback in form of haptic, tactile, auditory and/or visual feedback. It is also preferred that the feedback is returned by means that are connected to the detection device rather than part of it. For example, speakers, displays, microphones or other devices for transmitting and reproducing sound and/or images can be connected to the detection device by cable or wireless (e. g.

Bluetooth, optical transmission, acoustic transmission). However, the feedback can also returned by means that are part of the detection device in addition or instead to the means that are connected to the detection device.

Furthermore, it was very surprising that the interaction between the information carrier and the detection device can be improved by the device vibrating during the interaction. However, it is also preferred that the device is vibrating after the interaction to indicate a successful or unsuccessful interaction. In this context, it may be preferred, that the device gives a tactile, acoustic and/or visual signal before, during and/or after the interaction. The signal may also indicate a successful or unsuccessful interaction. In a preferred embodiment, the signal can be used as a guiding system for the user to optimize or improve the interaction between the information carrier and the detection device, especially the touch screen. Furthermore, it is preferred, that the information carrier has supporting features. These supporting features allow to align the information carrier in an optimal way with the detection device, especially the touch screen. The features comprise mechanical, tactile, haptic or other means for improving the positioning of the information carrier. It is further preferred that the detection device and/or the touch screen comprises magnetic, mechanical, acoustic, tactile and/or visual positioning means, helping to improve the positioning of the information carrier on the touch screen of the detection device.

In a preferred method, the detection device is detecting whether the information carrier interacts with the touch screen. It was very surprising to adapt the detection device in a way, that it easily detects the proximity of the information carrier. Preferred detection devices contain a photosensor, measuring the light intensity. The sensor can be modified to detect the information carrier, as moving the information towards the touch screen shades the screen from light, which can be detected by the detection device. The shaded area on the touch screen can also be used to differentiate between an information carrier and a finger, triggering different events or actions.

It may also be preferred that the information carrier corresponds to a stored data set in a data processing system. This data set may be either static or dynamic.

It may also be preferred that the information carrier corresponds to a certain event in the data processing system. This means that the information carrier could be used to induce this event.

The invention also relates to a system performing the preferred method comprising:
a. an information carrier comprising a dielectric and/or conductive pattern which encodes information and
b. a detection device having a touch screen; the detection device is able to decode the information upon interaction between the information carrier and the touch screen, wherein the interaction is caused by a difference in the dielectric coefficient and/or the conductivity of the pattern.

The features concerning the preferred method also apply to the preferred system and vice versa.

It is preferred that the system comprises an information carrier comprising a dielectric and/or conductive pattern which encodes information and a detection device having a touch screen, wherein the detection device is adapted to decode the information upon interaction between the information carrier and the touch screen, wherein the interaction is based on a difference in the dielectric coefficient and/or conductivity of the pattern. The information carrier may have any of the features discussed above with respect to the method.

It is preferred, that the size of the information carrier is smaller than the size of the touch screen or the size of the information carrier is equal to the size of the touch screen or the size of the information carrier is bigger than the size of the touch screen. The interaction between the information carrier and the touch screen can be improved by various supporting features, that can be on the information carrier, or on the touch screen and/or in the depiction on the touch screen, comprising tactile, haptic, optical, acoustical, mechanical and/or magnetic features. Therefore, it may be advantageous when the system comprises at least one mean for the determination of pressure, force, visual information, acoustic information, proximity, movement, tilt and/or orientation. This mean might be a sensor or another device for measuring these physical features. In addition to the supporting features, which improve the interaction between the information carrier and the touch screen, the detection, the touch screen and/or the information carrier comprises at least one magnetic, mechanical, acoustic, tactile and/or visual positioning mean. The supporting mean gives for example a feedback of a successful interaction, whereas the positioning mean is for aligning or positioning the information carrier on the touch screen in an optimal way.

Furthermore, it is preferred that the system provides information about the states and/or actions comprising:
the user needs assistance,
the user has a connection to the touch screen,
the user has no connection to the touch screen,
the user has a connection to the information carrier,
the user has no connection to the information carrier,
the position of the information carrier was determined,
the orientation of the information carrier was determined,
the distance between the information and the touch screen was determined,
the touch screen has moved,
the touch screen has not moved,
the touch screen is moving,
the information carrier has moved,
the information carrier has not moved,
the information carrier is moving,
the user has moved,
the user has not moved,
the user is moving.

According to the present invention, one can use any suitable pattern detectable by a touch screen to encode information on an information carrier. That is, one is not limited to make use of the dielectric and/or conductive pattern (though this one has certain advantages as described above). Generally, any method with the following steps is suitable to read out information readable by a touch screen: providing an information carrier with a pattern that encodes information and a detection device having a touch screen; inducing an interaction between the information carrier and the touch screen; detecting a signal corresponding to the pattern with the detection device and decoding the signal to retrieve the encoded information, wherein the interaction is induced by relative motion between the information carrier and the touch screen. One preferred option is that the signal decoding is performed by the detection device. Any pattern detectable by the detection device having a touch screen can be used.

Examples include, but are not limited to, the dielectric and/or conductive pattern as described and a pattern formed by spatial deviations of an information carrier.

It is also preferred to have a detection device having a touch screen, wherein the detection device is adapted to decode information encoded within a pattern of an information carrier upon interaction of said information carrier with the touch screen by means of a decoding algorithm. In particular, it is preferred to use a computer program for this task.

Again, the inventive method is not limited to the use of only one information carrier. One may use one or more information carriers. This could, for example, allow for more complex operations.

The basic idea of the present invention is not limited to touch screens. Other capacitive devices whose mode of detection is based on capacitive interaction may be utilized as well. In particular, other touch devices such as touch pads or track pads may be used for the present invention. For example, information encoded on an information carrier may be transferred to a laptop by placing the information carrier on the touch pad or track pad of the laptop, which identifies the pattern via capacitive interaction. Accordingly, the detection device may comprise another touch device rather than a touch screen and the method may utilize another touch device rather than a touch screen, preferably a touch pad or track pad.

The present invention is further directed to a computer program comprising program code means for performing the following steps when said program is run on a detection device having touch screen: decoding a signal detected by the touch device/touch screen of the detection device to retrieve data representing information encoded in the signal; and inducing an event in the detection device based on the retrieved data.

Although the invention has been described with respect to specific embodiments and examples, it should be appreciated that other embodiments utilizing the concept of the present invention are possible without departing from the scope of the invention. The present invention is defined by the claimed elements, and any and all modifications, variations, or equivalents that fall within the true spirit and scope of the underlying principles.

The present invention is described by way of examples in more detail below referring to the following Figures:

FIGS. 1 to 5 Preferred embodiments of a information carrier

FIGS. 6 to 25 Examples of interactions between an information carrier and a detection device with a touch screen FIGS. 1 to 5 show preferred embodiments of a information carrier. FIG. 1 is a top view of an information carrier 1 comprising a substrate 2 of a first material with the dielectric coefficient ε1 and a dielectric pattern formed by regions 3 of a second material with the dielectric coefficient ε2 and the substrate 2. In other words, the dielectric pattern comprises most of the surface of the substrate 2, on the one hand, and the regions 3, on the other hand. The substrate 2 preferably comprises a non-conducting material such as plastics, synthetic materials, paper, carton, (derived) timber products, composite materials, ceramics, glass, cloths, textiles, leather or any combination of the mentioned materials. The regions 3 preferably comprise a conducting material such as metals, metal particles, materials comprising conductive particles, conductive polymers, carbon black and/or graphite, salts, electrolytes or any combination of the mentioned materials.

The regions 3 forming the pattern together with the substrate 2 may be of different shapes and/or sizes, possible shapes including (but not limited to) circles or squares. Yet, any other shape not represented within the Figures may be used. A single information carrier may comprise a pattern with regions 3 of different shapes and/or sizes, the shapes including circles, rectangles, squares, triangles and/or other shapes. It is preferred that the regions 3 are separated by a predetermined distance, at least 20 µm, preferably at least 1 mm. Thus, the different regions 3 may me distinguished by a touch screen as separate regions.

Preferably, the regions 3 forming the pattern are arranged or applied on top of the substrate 2. Yet, the pattern may also be applied to the bottom of the substrate 2. The substrate 2 may also be provided with a pattern of recesses, the recesses being filled with the second material. Thus, a completely flat surface of the pattern may be achieved even in case of the regions having a thickness disturbing the impression of a smooth surface. It is generally preferred that the pattern formed by the substrate 2 and the regions 3 is substantially flat.

A substantially flat surface may be achieved by printing or laminating the regions 3 onto the substrate 2. Even though the printed or laminated regions 3 will have a certain thickness, the surface will nevertheless be considered as substantially flat by a user due to the impression of a smooth surface. In order to achieve a substantially flat surface the regions 3 may also be embedded within the substrate 2 and/or the top of the information carrier 1 may be covered or coated at least partially with a layer of additional material.

Figure 3:
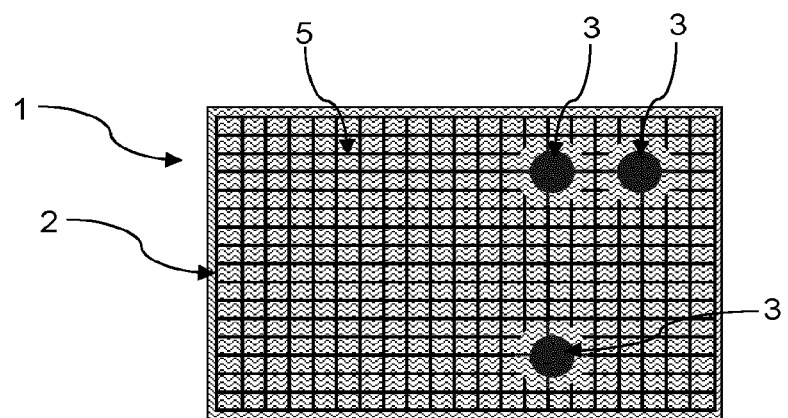
Figure 4:
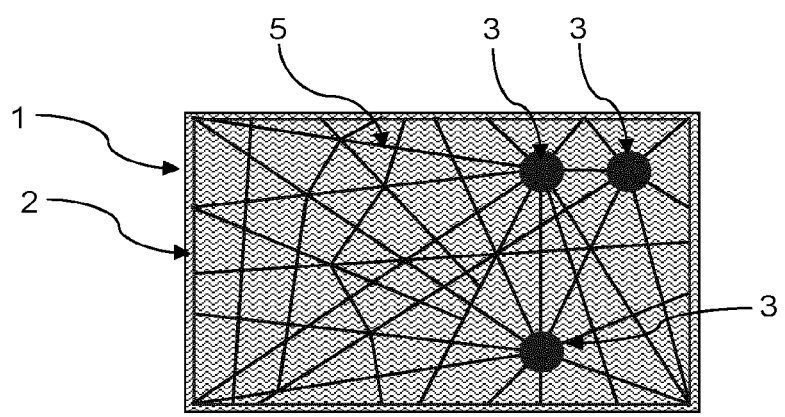

It is also preferred to provide a grid of conducting lines covering a part or all of one, both or all surfaces of the substrate. Examples of such grids are shown in FIG. 3 and FIG. 4. The grid may consist of a regular pattern of electrically conducting lines or of an irregular arrangement of electrically conducting lines. Other grids or line patterns as the ones shown may be utilized as well. The grid does not necessarily have to cover the entire surface of the information carrier but may also be provided in one or more regions, only. The grid acts as the coupling area since a user may touch the surface of the carrier at any portion which does comprise the grid. It is in particular preferred to substantially extend the grid to the outer perimeter of the substrate 2, e.g. by a surrounding conductive line. This will ensure the coupling effect at any stage of usage of the information carrier. The conductive regions 3 may be directly connected to all conductive lines of the grid which cross or traverse the regions 3. However, this sometimes causes perturbations to the signals being detected and/or leads to noise in the signal. It is thus preferred that the conductive regions 3 are electrically connected to the grid only via some or even only one of the conducting lines crossing or traversing the regions. For example, each conductive region 3 can be directly connected to two conductive lines which cross the regions only, whereas the remaining lines are interrupted proximate the conductive regions 3. This embodiment is surprisingly less susceptible to faults.

Figure 5:
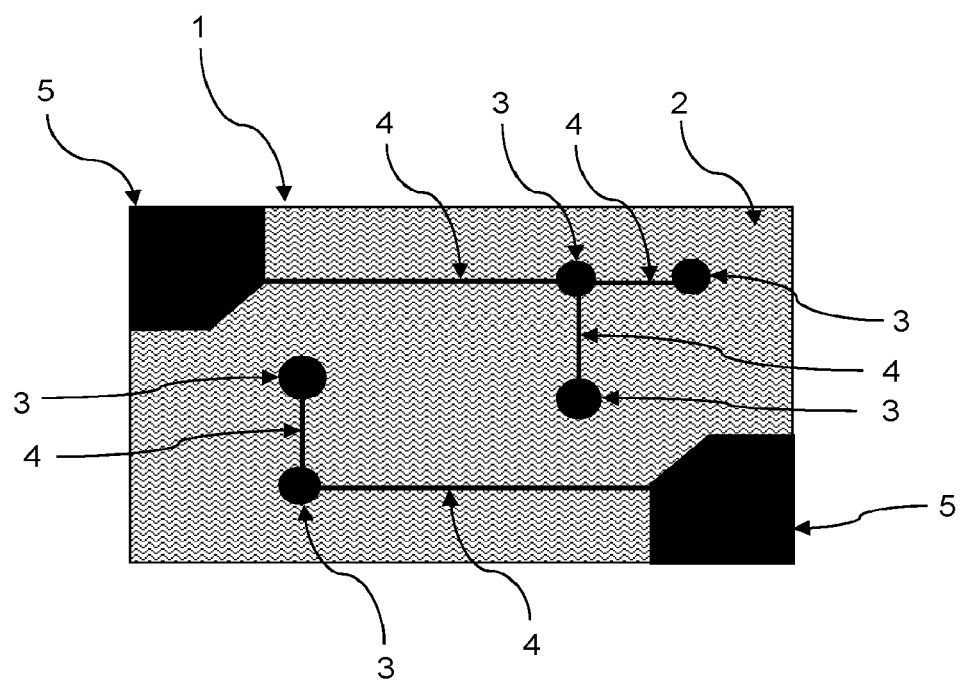
Figure 6:
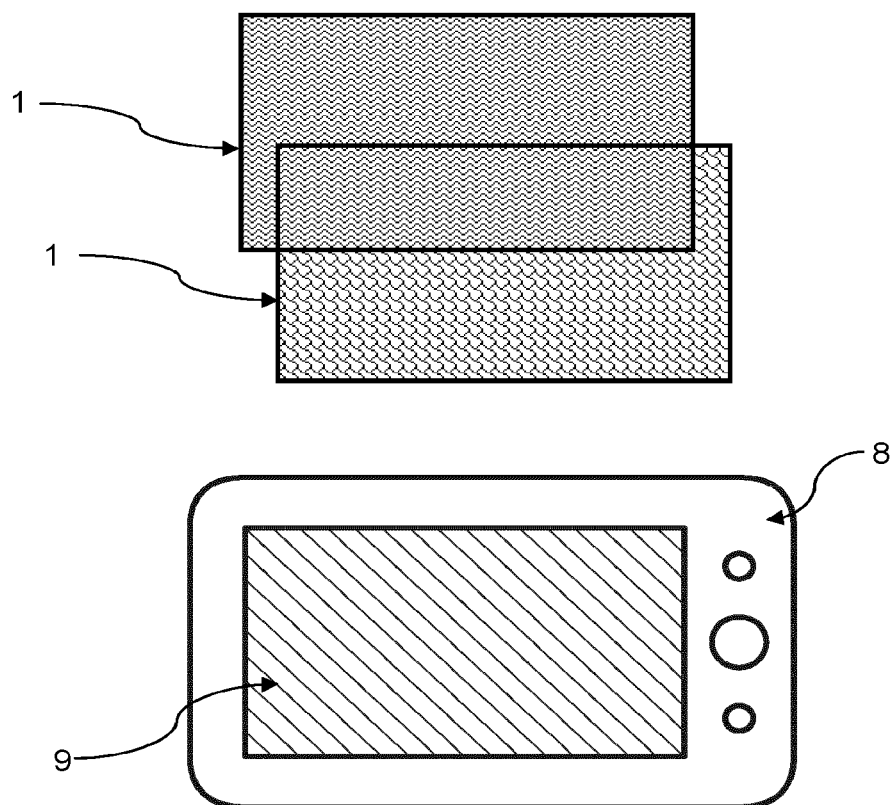
Figure 7:
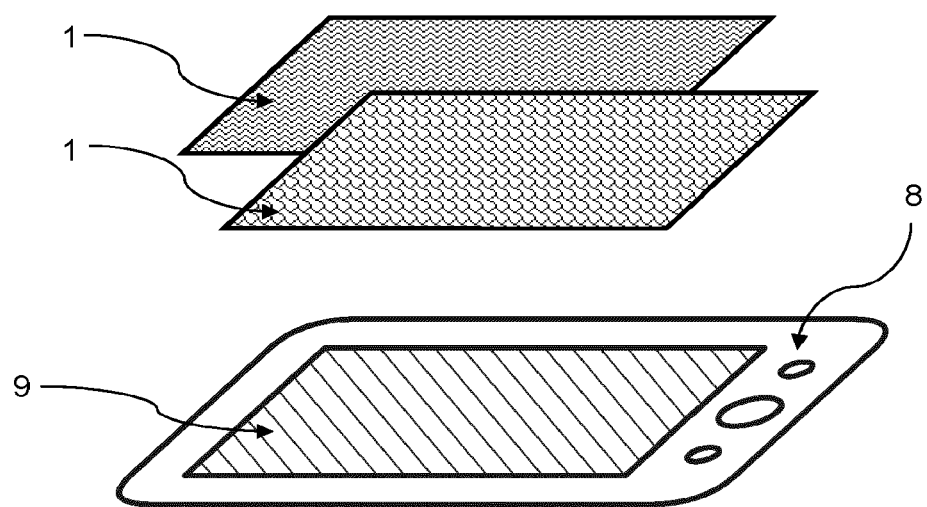
Figure 8:
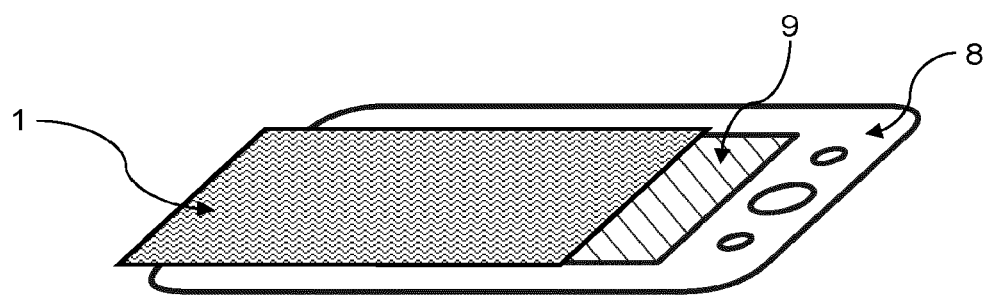
Figure 9:
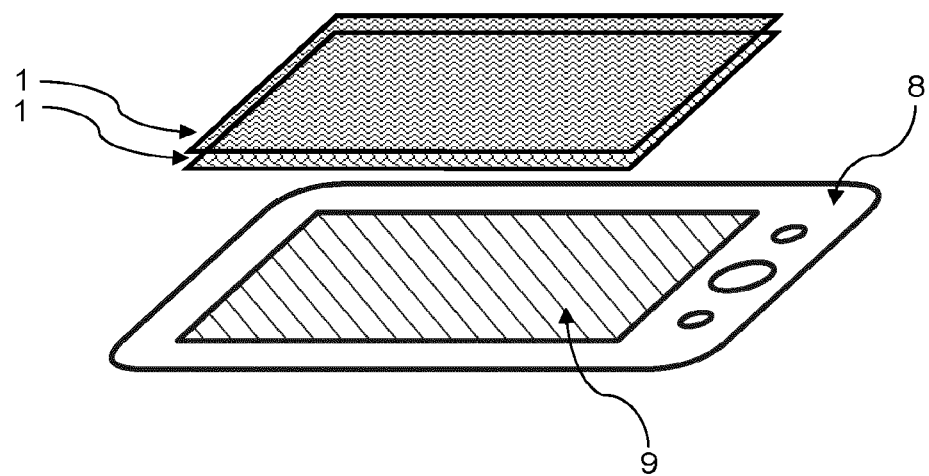
Figure 10:
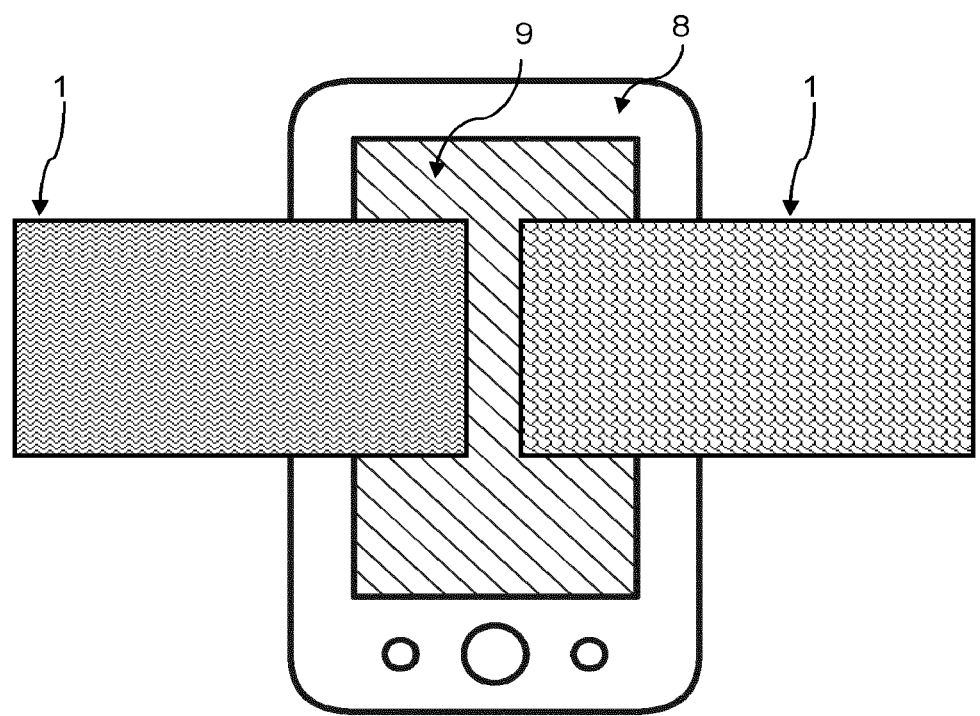
Figure 11A:
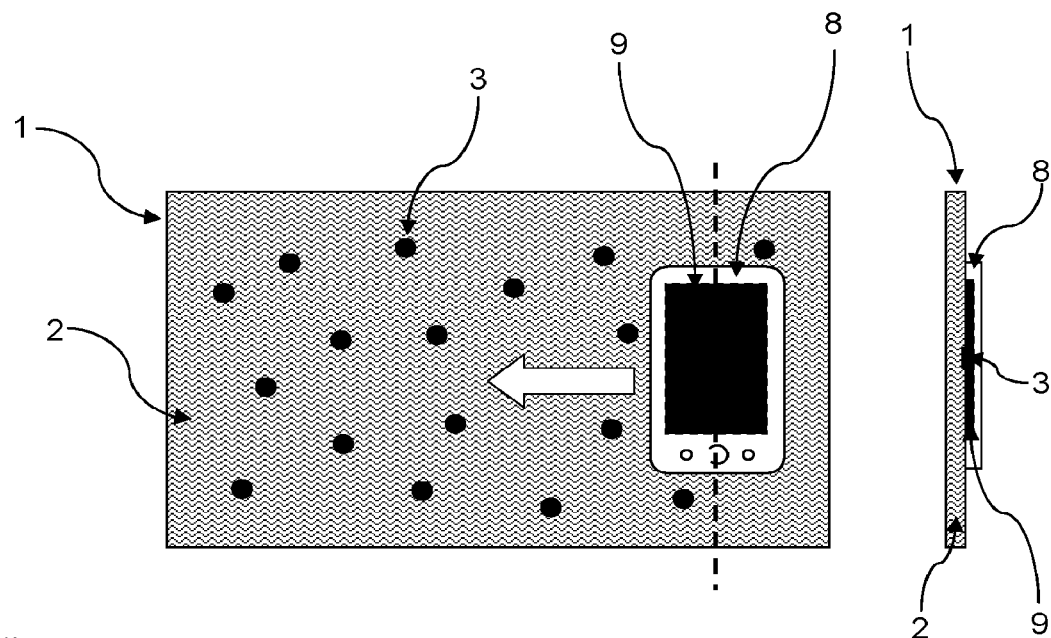
Figure 11B:
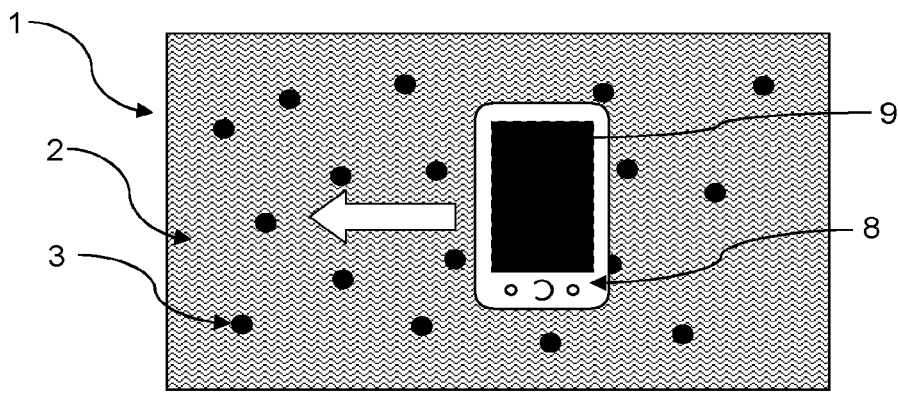
Figure 11C:
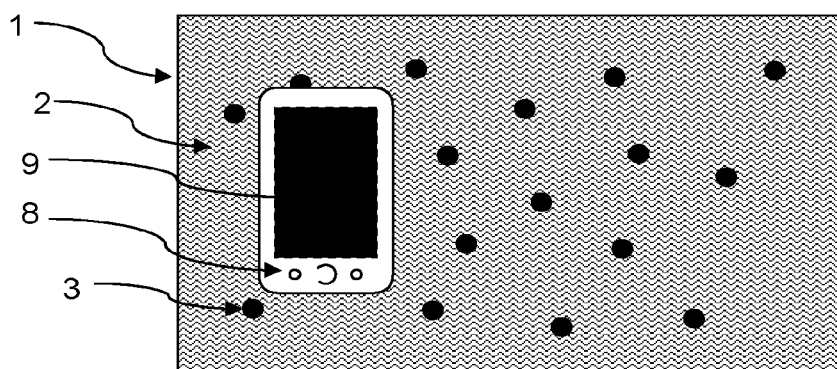

The substrate 3 of the information carrier 1 can be is formed by a non-conducting material and the regions 3 are of conductive material, it is preferred to connect (at least) some of the regions 3 via conductive paths 4. Their cross section (parallel to the surface of the information carrier 1) of these paths 4 may be smaller than the diameter of the regions 3. However, their cross section may also be of an equal or even larger size than the diameter of the regions 3. Due to the conductive paths 4 the regions 3 are on the same electric potential, which may be advantageous to provide a constant well-defined signal by each region 3. It is preferred to connect at least one of the regions 3 to a coupling area 5 via conductive paths 4 (see e. g. FIG. 5). Touching the coupling area 5 with a finger will set the regions 3 electrically connected to the coupling area 5 on the same electric potential as the user. Furthermore, the capacity measured by the touch screen will more closely resemble the typical capacitive change induced by a finger touching the touch screen. When viewed from the top, the position of this coupling area may include to be located remote from the edges of the substrate 2, as well as on one side edge of the of the information carrier 1. However, other positions (e.g. in one corner) are also possible. It is in particular preferred to provide a coupling area 5 surrounding substantially the entire carrier 1 to provide possible touch locations to a user around the entire edge of the carrier. The coupling area 5 may be provided on the same side of the carrier as the regions 3. Alternatively, it may be provided on the opposite side (not shown). Thus, a user may touch the coupling area on the back side even if the front side completely contacts the touch screen. Furthermore, it is possible that the coupling area 5 coincidences with one or more of the regions 3 of conductive material and/or with one or more of the conductive paths 4. For example the coupling area 5 may coincidence in fact with all regions 3 of conductive material. Alternatively, the coupling area 5 may coincidence with all conductive paths 4. The coupling area 5 may be electrically connected to all regions 3. Alternatively, only one or more of the regions 3 are electrically connected to the coupling area 5, while one or more of the regions 3 are electrically insulated from the coupling area 5. In certain embodiments, two or more coupling areas 5 are provided which are connected via electric paths 4 to two or more subsets of regions 3 of conductive material, as is shown in the embodiment of FIG. 5, in which a first subset comprises three regions 3 and a second subset comprises 2 regions 3 electrically connected to one coupling area 5, respectively. Thus, the user may decide which subset of regions 3 is to be set on the user's potential by touching one of the two coupling areas 5 only. If the touch screen is sensitive to regions 3 only, which are electrically connected via a coupling area to a user, the touch screen will detect the three regions 3 of the first subset or the two regions 3 of the second subset depending on the user's touch location. Accordingly, the type of detectable information encoded on the information carrier may be influenced by the user choosing a coupling area 5.

The information carrier may also comprise more than two coupling areas with corresponding subsets of regions 3. For example, a coupling area 5 may be provided at each corner and/or each edge and/or each side of the information carrier. The different coupling areas may be color coded or otherwise identified to the user as generating a particular signal (corresponding to the particular subset of the pattern).

According to an embodiment of the invention, the embedded regions 3 are combined with regions 3 on top of the substrate. In other words, the pattern formed by the regions and the substrate don't need to be arranged within one two-dimensional area but may also have a component in the third dimension. Preferably, the touch screen is adapted to distinguish between embedded regions and regions applied on top due to their different signal strength.

FIGS. 6-11 show interactions between two information carriers 1 and a detection device 8 comprising a touch screen 9. One preferred method to perform this interaction is to place at least part of the information carrier 1 on at least part of the touch screen 9. It may be necessary to place essentially the complete information carrier onto the touch screen 9 to generate the appropriate signal. Yet, it is preferred that it suffices to place only part of the information carrier onto the touch screen. Thus, a portion of the information carrier remains free which allows a user to, e.g., easily touch one or more coupling areas. The signal generated in the touch screen may depend on the orientation of the carrier with respect to the touch screen. Yet, it is preferred that the signal does not depend on the orientation. For this purpose, the pattern may comprise a predetermined sub-pattern which is used to identify the orientation of the carrier with respect to the touch screen.

One can also (at least partially) place two or more information carriers 1 onto different parts of the touch screen 9 of the detection device 8. This allows for more complex operations such as generating signals defined by a specific combination of carriers. Preferably, the portion of the information carrier to be put into contact with the touch screen is marked on the carrier to ease its use. Preferably, the one or more coupling areas are provided in portions which are not to be put into contact.

It is also preferred that the interaction between the touch screen 9 of the detection device 8 and one or more information carrier(s) 1 may be induced a dynamic interaction rather than a static one. For example, inducing the interaction may comprise moving the information carrier with respect to the touch screen or vice versa. For example, swiping the detection device 8 across the information carrier 1 may induce an interaction. The block array indicates the direction of the movement of the detection device 8. On the right side in FIG. 11a, a section across the top view is also included. The direction of movement may be marked on the information carrier for the user's convenience. Movement in different directions may also cause different signals to be detected by the touch screen. Movement includes also rotation or up and down motions.

Figure 12:
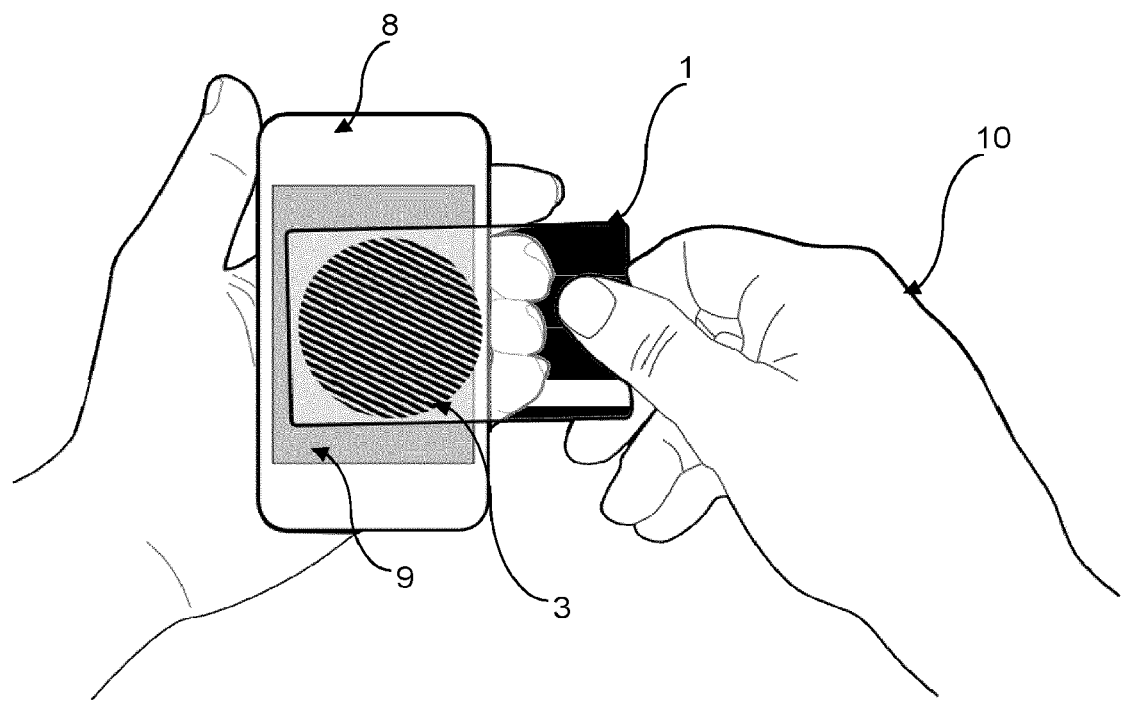
Figure 13:
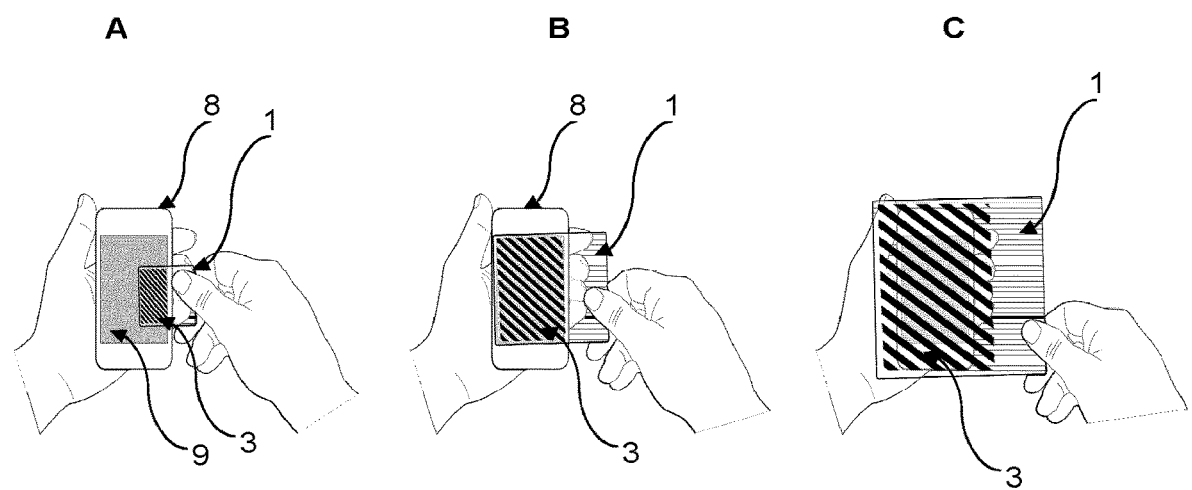
Figure 14:
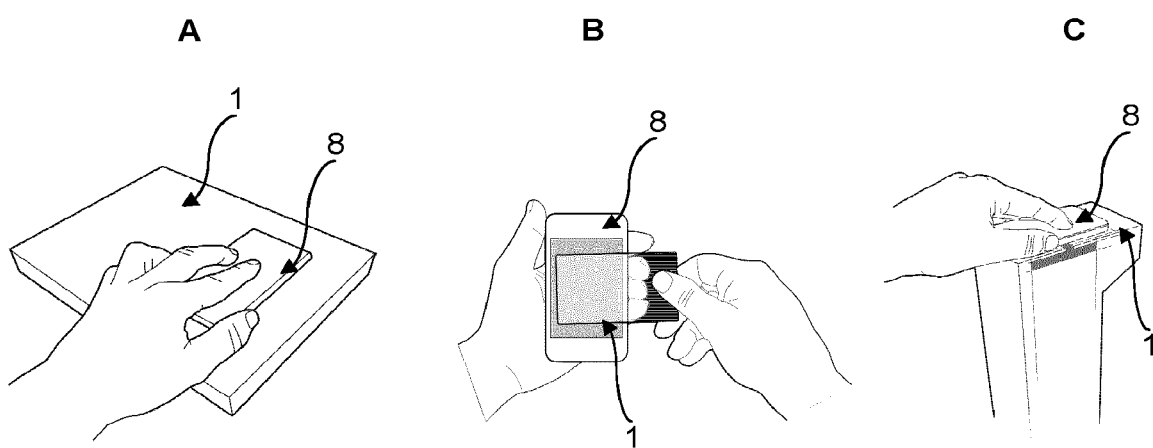
Figure 15:
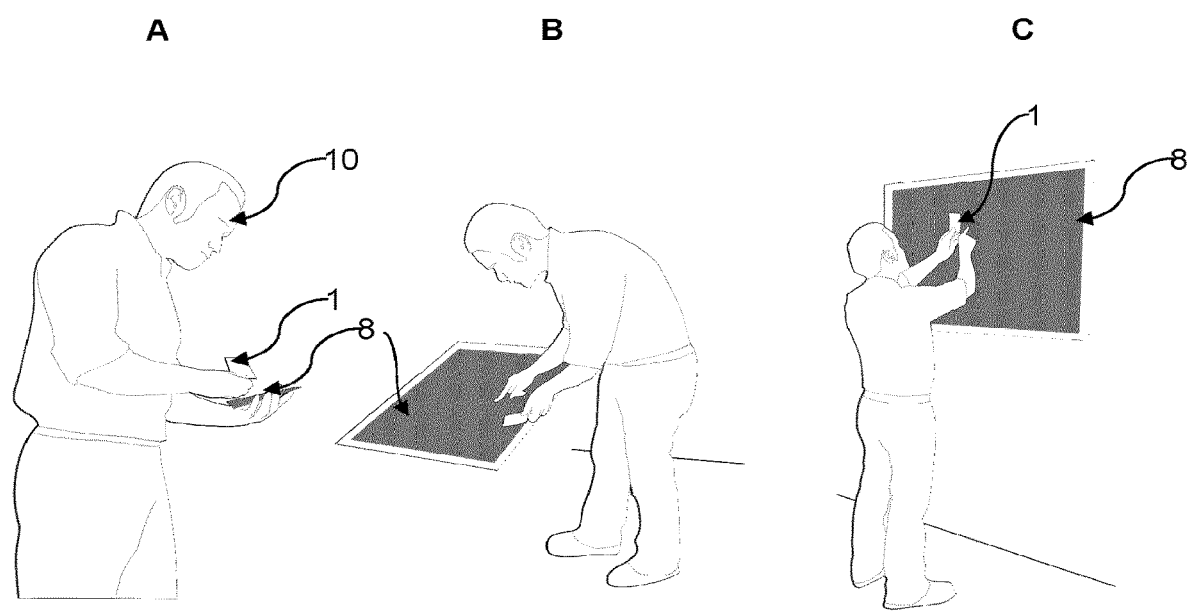
Figure 16:
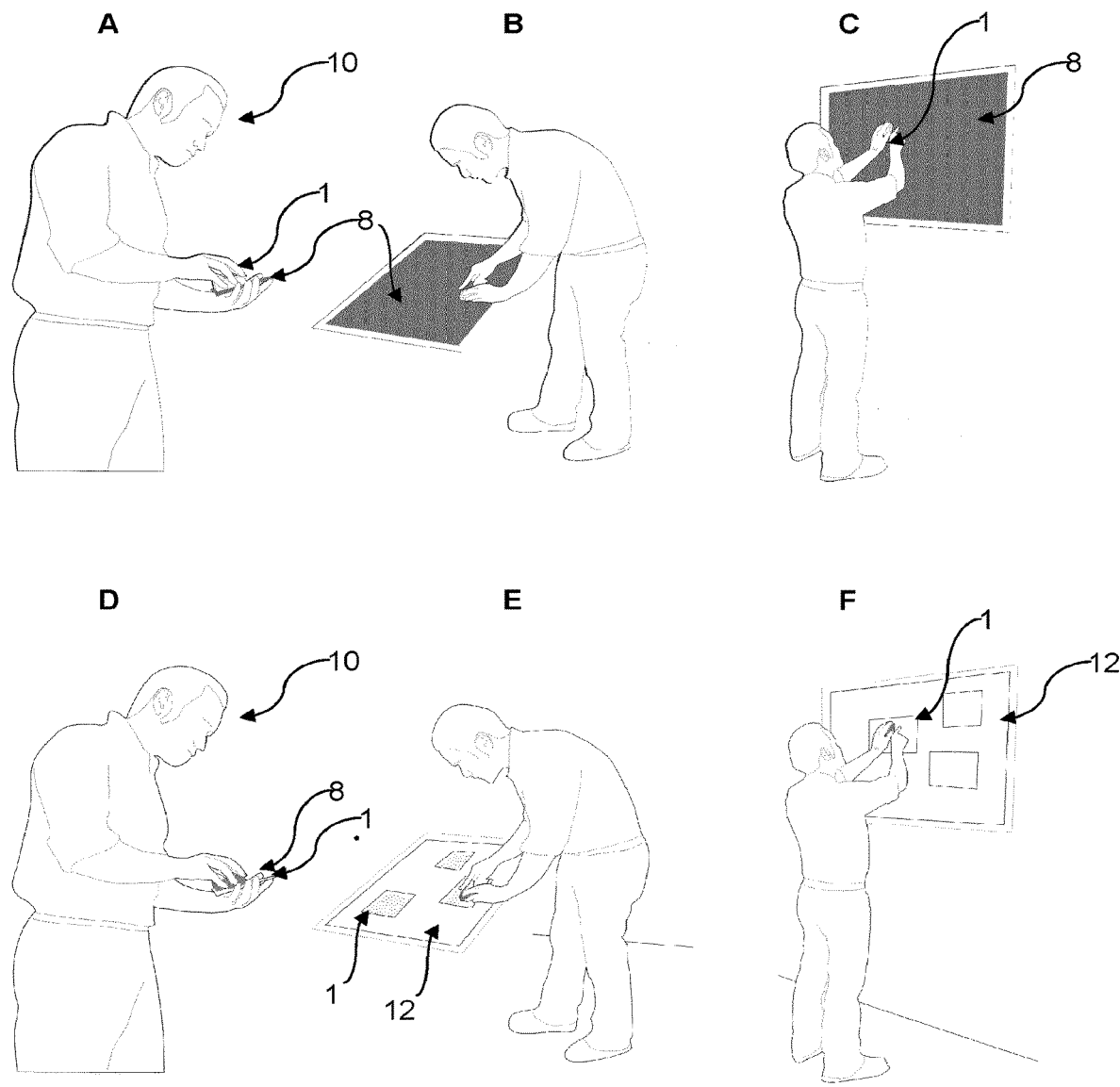
Figure 17:
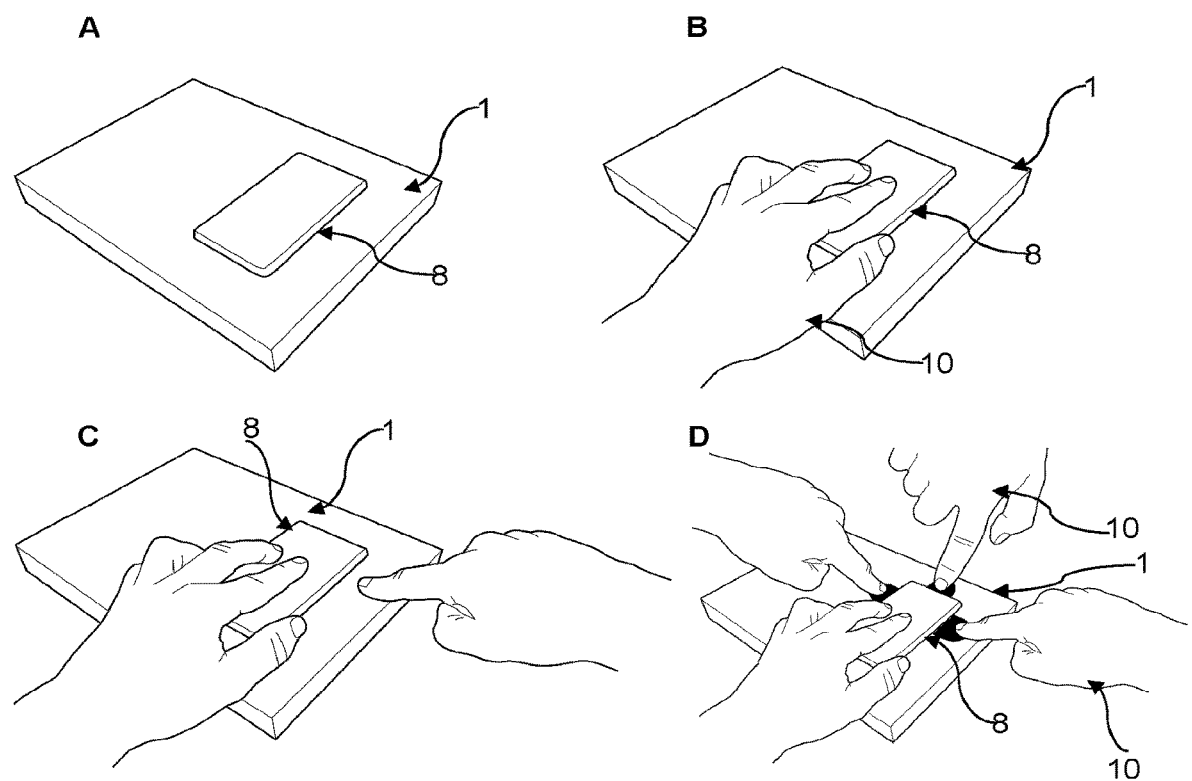
Figure 18:
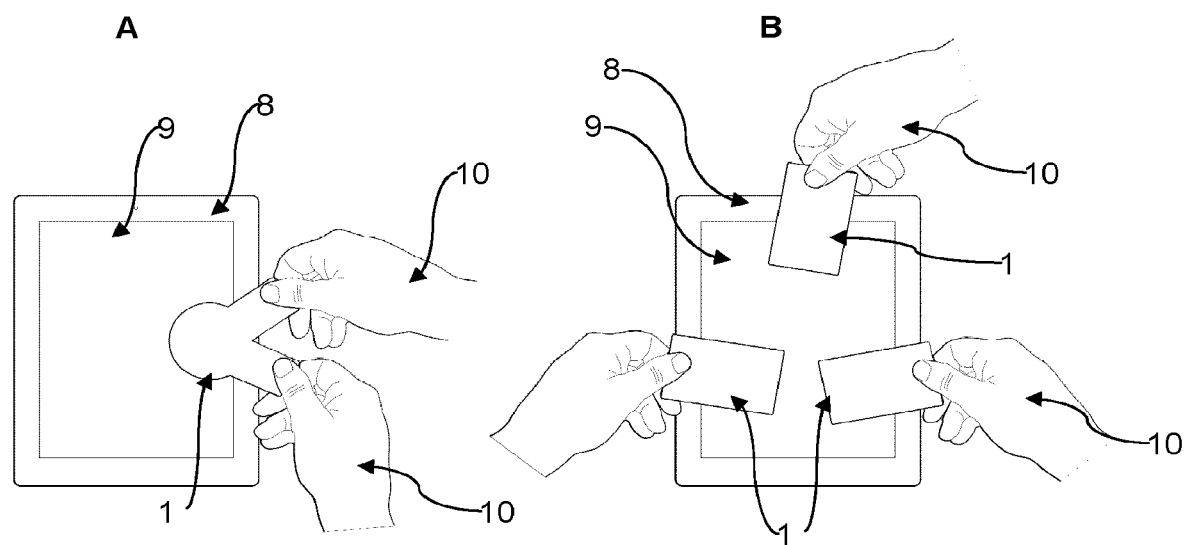
Figure 19:
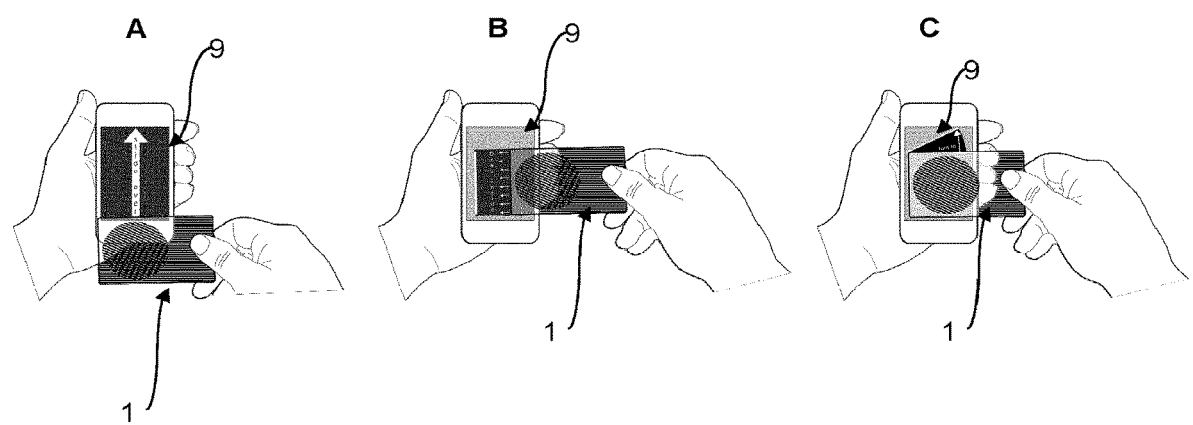
Figure 20:
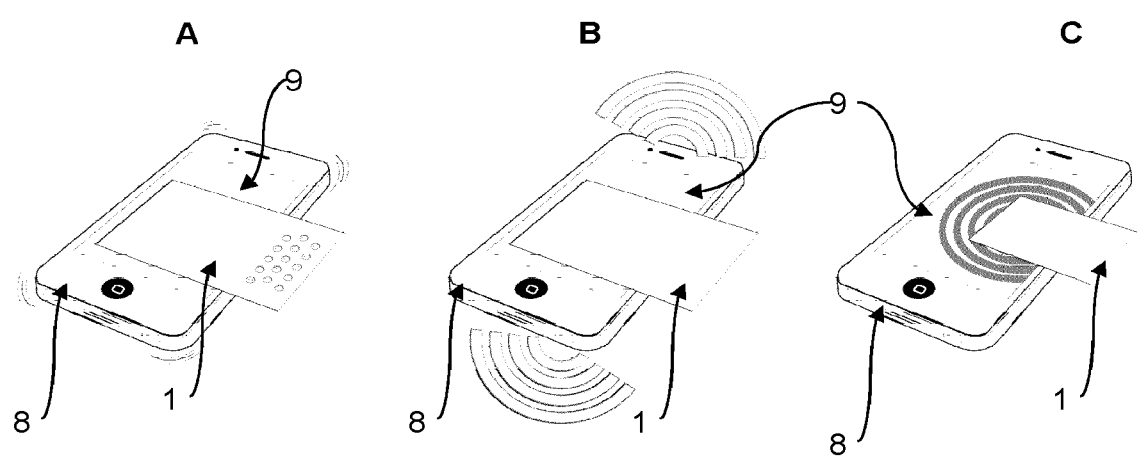

FIG. 12 shows the interaction of the information carrier with the detection device, especially the touch screen of the detection device. A user 10 can place the information carrier 1 comprising a region 3, to generate a touch event on the touch screen 9 of a detection device 8 and holding the information carrier 1 simultaneously. However, it may also preferred, that the information carrier 1 is placed on the touch screen 9 without being hold by the user 10. The information carrier 1 can have various sizes in relation to the touch screen 9 (see FIGS. 13A-C). It 1 can be smaller than, equal to or bigger than the touch screen 9. The size does not matter for an interaction to occur. It may only render the way of the interaction. If the information carrier 1 is bigger than the touch screen 9, it may be advantageous to move the detection device 8 over the information carrier 1. However, it is also possible to move the information carrier 1 relative to the detection device 8. In this context, it may be advantageous if the information carrier 1 or the detection device 8 is stationary, whereas the other is mobile (see e.g. FIGS. 14A-C). The static one can be aligned in a vertical or horizontal orientation, allowing the user to use either the information carrier 1 or the detection device 8 while standing or sitting (see e. g. FIGS. 15A-C). It is preferred that the information carrier 1 is printed on an object or that the object is the substrate for the information carrier 1 (see FIGS. 16A-C). The object carrying the information carrier 1 can be moved over a detection device 8, that can be oriented in a horizontal or vertical way. The information carrier 1 can also be scant by a detection device 8, wherein the detection device 8 is moved over the information carrier 1 (see FIGS. 16A-F), when the information carrier is positioned on or at a surface 12. The surface 12 can be part of a bigger object as well.

The interaction between the information carrier and the touch screen can be induced in various ways (FIGS. 17A-D).

The detection device 8 can be applied to the information carrier 1 to scan it, without the need to be touched by a user 10. However, it can be preferred that a user 10 is applying the detection device 8 to the information carrier 1 by only touching the detection device 8 and/or also the information carrier 1. The information carrier 1 and/or the detection device 8 can also be touched by more than one user 10. It is also possible that two users touch the information carrier 1 and bring it in contact with a touch screen 9 of a detection device 8 (see FIGS. 18A-B). Furthermore, more than one information carriers 1 can be brought in contact with the touch screen 9. This can be done by only one user or more than one user. It is also possible that the information carrier is touched by two user.

The interaction between the information carrier 1 and the touch screen 9 is preferably induced by relative motion between both of them (FIGS. 19A-C). Gestures can be used to apply the information carrier 1 to the touch screen 9 (e. g. slide-through, slide in or turn-key gestures) Arrows indicate the direction of movement.

Figure 21:
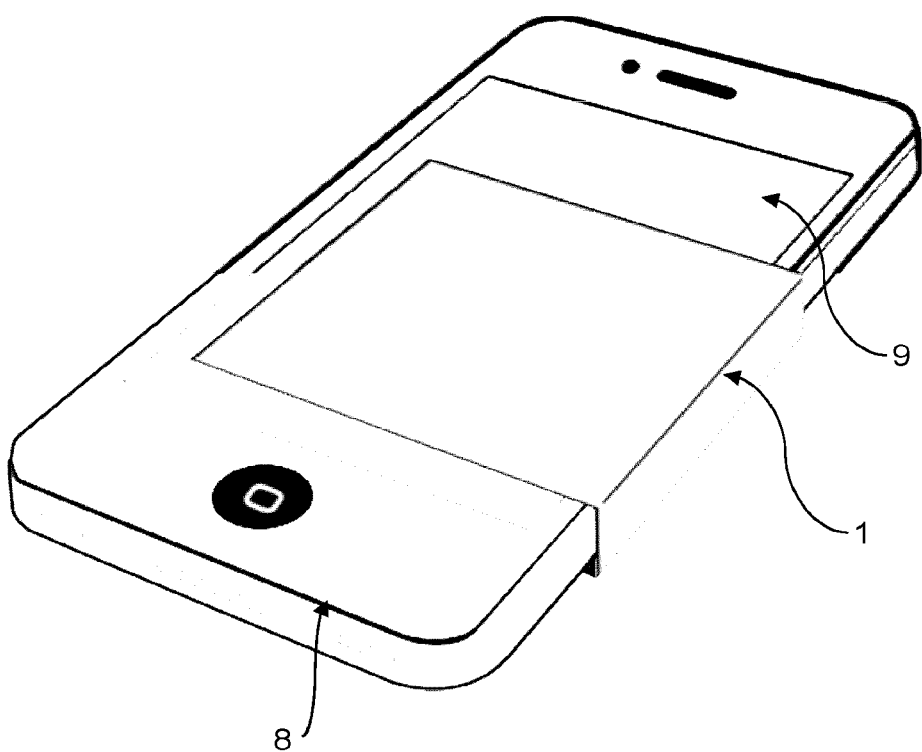
Figure 22:
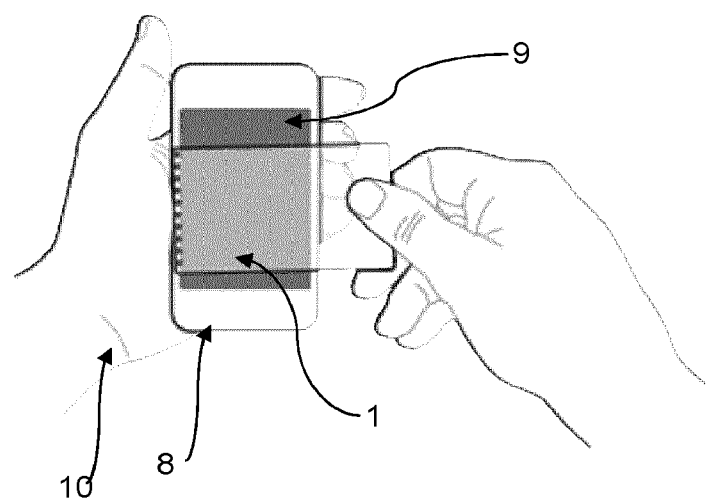

To optimize the interaction between the information carrier 1 and the detection device 8, especially the touch screen 9, it is preferred that the detection device 8 and/or the information carrier 1 return a feedback upon successful or unsuccessful interaction (FIGS. 20A-C). The feedback may comprise haptic, tactile, acoustic or visual feedback or combination of these. The information carrier 1 e. g. can comprise recesses and the detection device 8 can return tactile (FIG. 20A), acoustic (FIG. 20B) and/or visual (FIG. 20C) feedback. Furthermore, it is preferred that the information carrier 1 and/or the detection device 8 and/or the touch screen 9 contain means for positioning the information carrier 1 on the touch screen 9 (FIG. 21). The means comprise for example mechanical means such as an edge (FIG. 21), that allow the orientation of the information carrier 1 on the touch screen 9 in only one specific way. It is also possible to use the user (e. g. the hand of the user 10) as a limitation of movement in order to positioning the information carrier 1 in the correct way (FIG. 22). Using these positioning means, it is also possible to enhance the interaction or at least increase the possibility of interaction.

Figure 23:
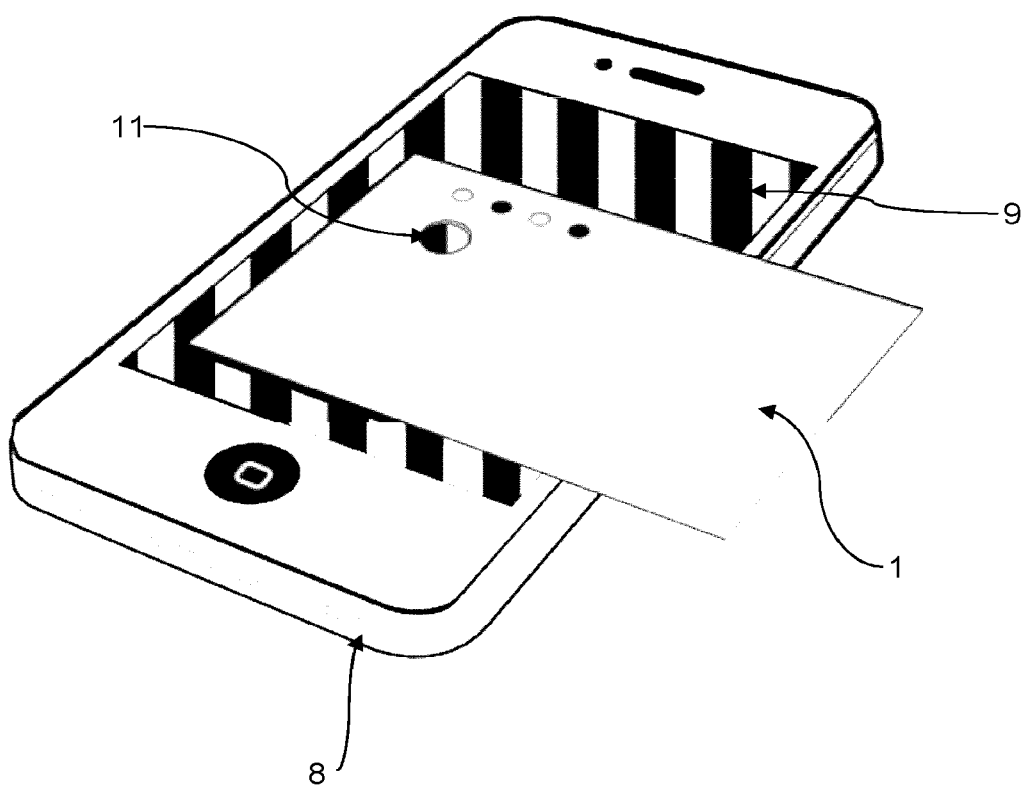

Specific visual effects of the touch screen 9 of the detection device 8 can interact with the information carrier 1 and generate new information (FIG. 23). This can be realized by recesses 11 on the information carrier 1 or by translucent material of the information carrier 1.

Figure 24:
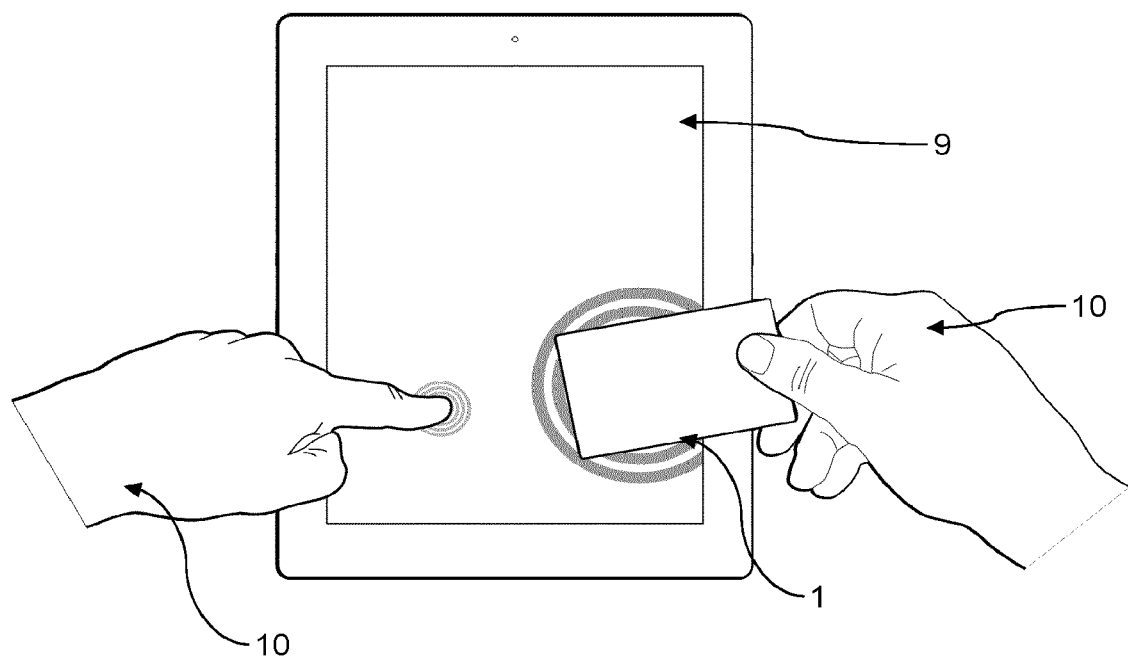

It is preferred that the detection device 8 differentiates between a touch signal generated by a finger of an user 10 or by an information carrier 1 (FIG. 24). This differentiation reduces mistakes in usage or interaction. The different touch signals can be displayed by the touch screen 9 in different colours or forms.

Figure 25:
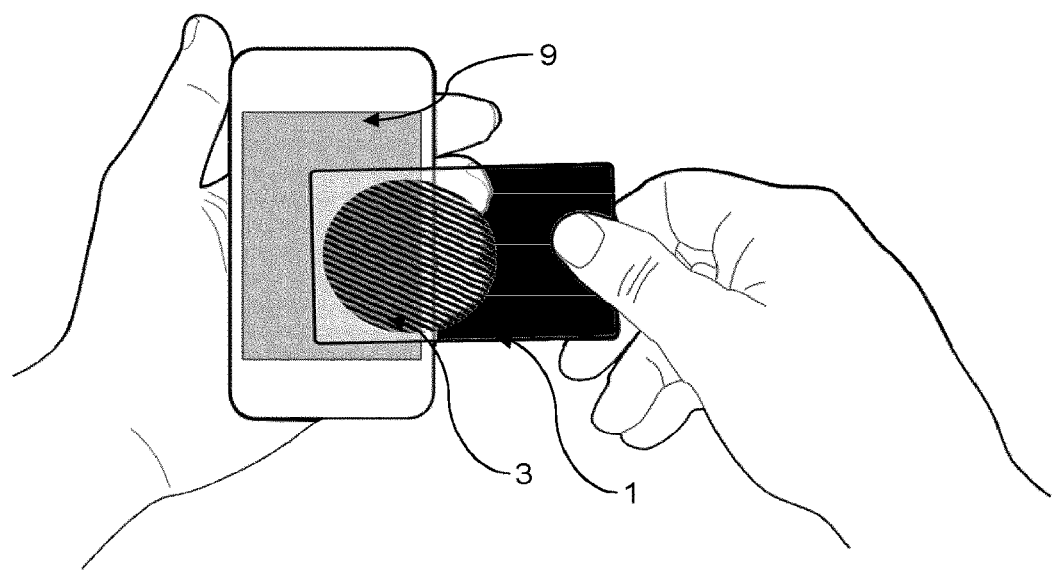

It is advantageous that the information carrier 1 with a region 3 can be partially applied to the touch screen 9, without failing to generate a feedback (FIG. 25). The feedback or guiding system or support system is for example to invite the user to place the information carrier 1 differently or fully on the touch screen 9.

The invention claimed is:

1. A method comprising the following steps:
    a. providing one or more information carrier(s) with a conductive pattern defining regions having different conductivities and a detection device having a capacitive touch screen and
    b. inducing an interaction between the information carrier and the capacitive touch screen, wherein the interaction is based on a difference in the conductivity of the regions of the conductive pattern and generates a touch signal and
    c. wherein the interaction is induced by relative motion between the information carrier and the capacitive touch screen bringing the information carrier to closer to the capacitive touch screen.

2. A method according to claim 1, wherein the relative motion includes manipulating gestures, deictic gestures, and/or symbolic gestures, emulating gestures and/or imitating gestures.

3. A method according to claim 1, wherein the relative motion includes a slide-through-gesture, a slide-in-gesture, a turnkey-gesture, putting, slapping, crumpling, rubbing and/or a combination of these.

4. A method according to claim 1, wherein a feedback is returned from the detection device and/or a device connected to the detection device by haptic perception, tactile perception, auditory perception and/or visual perception.

5. A method according to claim 1, wherein inducing the interaction is achieved by bringing the information carrier and the capacitive touch screen into at least partial direct contact.

6. A method according to claim 1, wherein the interaction is induced by placing at least a part of the information carrier on at least a part of and the capacitive touch screen.

7. A method according to claim 1, wherein the detection device and/or information carrier is moved.

8. A method according to claim 1, wherein the detection device is vibrating during and/or after the interaction.

9. A method according to claim 1, wherein the detection device gives a tactile, acoustic and/or visual signal before, during and/or after the interaction.

10. A method according to claim 1, wherein the information carrier has supporting features.

11. A method according to claim 1, wherein the detection device comprises magnetic, mechanical, acoustic, tactile and/or visual positioning means.

12. A method according to claim 1, wherein a proximity between the information carrier and the capacitive touch screen is detected by the detection device.

13. A method according to claim 1, wherein each single interaction occurs for less than 1 minute.

14. A method according to claim 1, wherein the interaction between a user of the detection device, the capacitive touch screen and/or the information carrier comprises the following interactions:
    the user is interacting with the information carrier,
    the information carrier is interacting with the capacitive touch screen,
    the user is interacting with the information carrier and the capacitive touch screen,
    the information carrier is interacting with the user and the capacitive touch screen and/or
    the capacitive touch screen is interacting with the user and the information carrier.

15. A method according to claim 1, wherein the information carrier is stationary and the capacitive touch screen is moving, the capacitive touch screen is stationary and the information carrier is moving or capacitive the touch screen and the information carrier are moving.

16. A method according to claim 1, wherein a user has two or more connections to the information carrier.

17. A method according to claim 1, wherein at least two users are connected to the information carrier and/or are interacting with the capacitive touch screen.

18. A method according to claim 1, wherein the detection device and/or information carrier is aligned in a vertical or horizontal orientation.

19. A method according to claim 1, wherein the detection device is detecting whether the information carrier interacts with the capacitive touch screen.

20. A system performing the method according claim 1 comprising:
   a. an information carrier comprising a conductive pattern defining regions having different conductivities which encodes information and
   b. a detection device having a touch screen; the detection device is able to decode the information upon interaction between the information carrier and the touch screen, wherein the interaction is caused by a difference in the conductivity of regions of the conductive pattern.

* * * * *